Sept. 5, 1950             J. R. URSCHEL             2,520,982
MACHINE FOR PREDETERMINEDLY SHAPING AND CUTTING AWAY
SURFACE PORTIONS OF DEFORMABLE SUBSTANCES Filed June 13, 1947                            3 Sheets—Sheet 1

INVENTOR.
Joe R. Urschel
BY
Atty.

Sept. 5, 1950 J. R. URSCHEL 2,520,982
MACHINE FOR PREDETERMINEDLY SHAPING AND CUTTING AWAY
SURFACE PORTIONS OF DEFORMABLE SUBSTANCES
Filed June 13, 1947 3 Sheets-Sheet 2
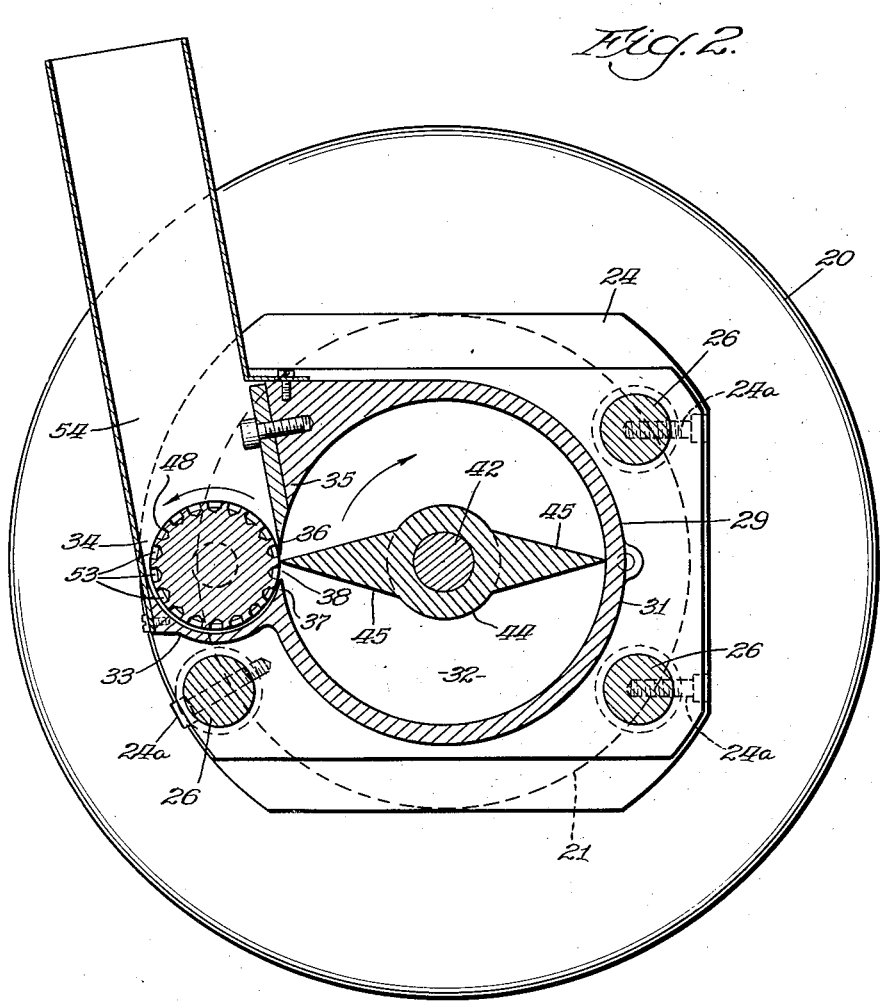
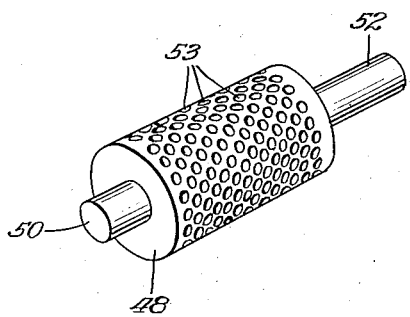
INVENTOR.
Joe R. Urschel Sept. 5, 1950           J. R. URSCHEL           2,520,982
MACHINE FOR PREDETERMINEDLY SHAPING AND CUTTING AWAY
SURFACE PORTIONS OF DEFORMABLE SUBSTANCES
Filed June 13, 1947           3 Sheets-Sheet 3
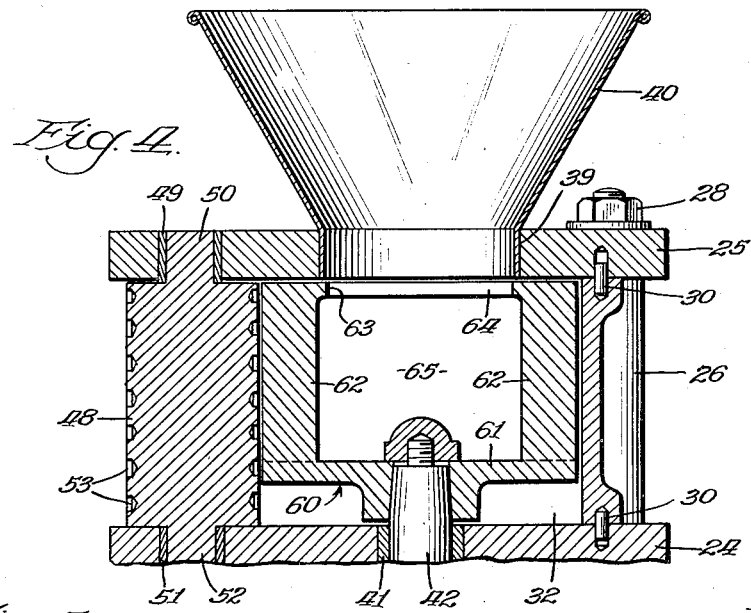
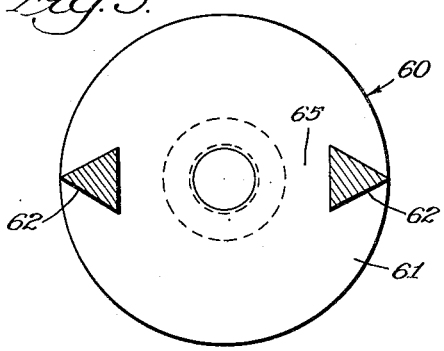
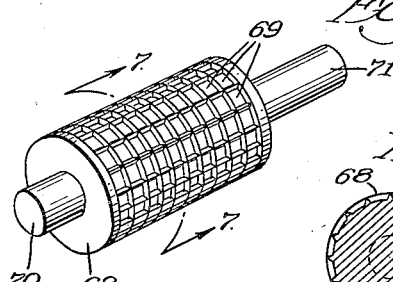
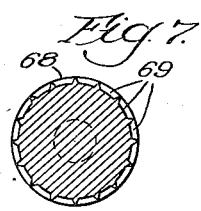
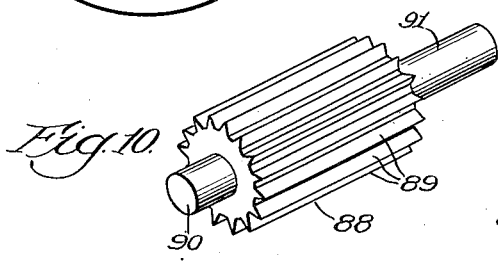
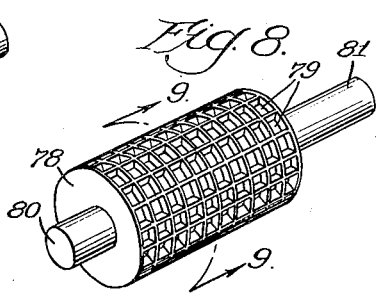
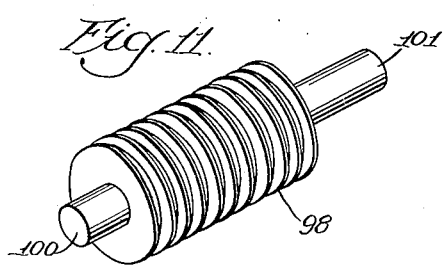
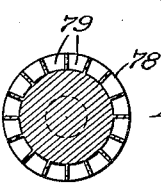
INVENTOR.
Joe R. Urschel
BY
Atty.

Patented Sept. 5, 1950

2,520,982

UNITED STATES PATENT OFFICE 2,520,982

MACHINE FOR PREDETERMINEDLY SHAPING AND CUTTING AWAY SURFACE PORTIONS OF DEFORMABLE SUBSTANCES

Joe R. Urschel, Valparaiso, Ind.

Application June 13, 1947, Serial No. 754,360

14 Claims. (Cl. 146—192)

The invention relates to a machine for reducing deformable substances by the expedient of shearing or slicing from such substance surface portions that are caused to extend outwardly from the main body of the substance. In its more particular aspects the invention is ideally applied in a machine for cutting up meat; although wider application is contemplated.

Considering the invention from the standpoint of its use in the comminution of meat products, there are several advantages to be realized over conventional meat grinders or choppers. The ordinary meat grinder comprises a screw which forces meat through a perforated plate, whereupon strings of the meat emerging tenacle-like from the discharge face of the plate are cut into short lengths by a shearing knife sweeping over such face. This popular machine is annoyingly slow in operation and dangerous to those persons who frequently attempt to hasten the operation by prodding the meat with their finger tips. Another disadvantage of this prior art machine is its susceptibility to becoming clogged or blocked by fat, gristle or bones in the meat whereupon the machine will cease to operate; since the motion of the meat through the machine is not positive. The same disadvantages are attendant upon the use of similar machines for grinding or otherwise reducing other food products such as fruits and vegetables. These disadvantages are present primarily because such machines do not operate upon the principle of directly depositing portions of the substance into position for being positively cut or sliced.

A principal object of the invention is to provide a machine having means for moving a deformable substance against and along a wall provided with an opening of substantial size to expose an area of the substance sufficiently large to incur no trammeling resistance to extrusion through the opening against means outside the wall and in association with the opening for receiving and shaping portions of the extruded surface, together with means for shearing or slicing off the shaped surface portions. Further objects of the invention are: to provide for forcing or extruding the surface portions by centrifugal force; to provide several types of receiving or shaping means having recesses, grooves or pockets of different sizes and shapes, whereby to vary the size and shape of the surface portions to be cut or sliced off; to provide for movement of the receiving or shaping means at such speed as to discharge the shaped and severed surface portions therefrom by centrifugal force; to provide a machine including a rotor chamber having a cylindrical side wall with an opening and containing a rotary impeller for moving the deformable substance about the side wall, and a rotary structure having a receiving or shaping surface in exterior registry with the opening to limit projection of substance portions outwardly thereof, there being also driving means for rotating the impeller and structure in such manner that said surface and the surface of the deformable substance thereagainst travel substantially in the same direction and at substantially the same peripheral speed toward a slicing knife at an edge of the opening for removing the projecting surface portions of the substance; and to provide a machine that may be simply and inexpensively constructed of relatively few parts and adapted for the handling of a wide variety of substances.

The foregoing and other desirable objects and features of the invention will become apparent as the disclosure is more fully made in the following detailed description and accompanying sheets of drawings in which:

Fig. 2 is a transverse sectional view of the machine shown in Fig. 1, the section being taken substantially along the line 2—2 of Fig. 1;

Fig. 3 is a perspective view of one form of receiving or shaping cylinder;

Fig. 4 is a fragmentary vertical sectional view of the upper portion of a modified machine similar to that shown in Fig. 1 but including a different form of rotary member for imparting initial movement to the substance to be reduced;

Fig. 5 is a transverse sectional view through the modified rotary member by itself;

Fig. 6 is a perspective view of a modified form of receiving or shaping cylinder;

Fig. 7 is a transverse sectional view of the cylinder as viewed along the line 7—7 of Fig. 6;

Fig. 8 is a perspective view of a still further modified form of receiving or shaping cylinder;

Fig. 9 is a sectional view taken on the line 9—9 of Fig. 8; and

Figs. 10 and 11 are perspective views of other modified forms of receiving or shaping cylinders.

Figure 1:
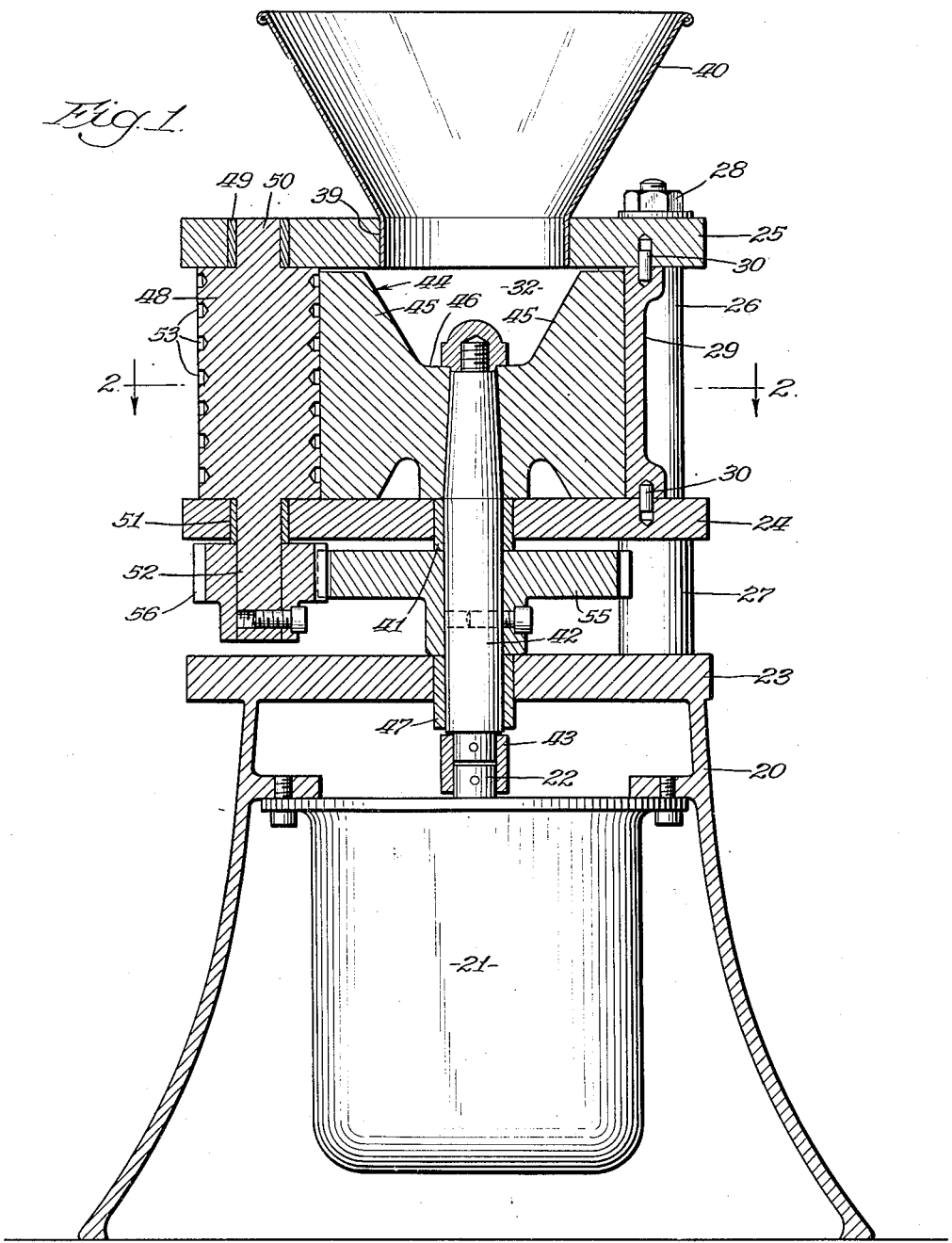
Fig. 1 is a vertical sectional view through a preferred embodiment of the invention.

The drawings illustrate preferred forms of the invention for achieving desirable results in the application of the invention to the cutting or reduction of meat. It should be understood, however, as stated above, that the invention has wider application; therefore, the present dis-

Figs. 1, 2 and 3

The machine includes a base or stand 20 having a hollow interior within which is housed and supported driving means in the form of an electric motor 21 having a driving shaft 22 arranged on a vertical axis. The upper portion of the base or stand 20 is in the form of a plate 23 on which is supported the reducing or cutting mechanism.

This mechanism includes a lower plate 24 above and paralleling the base plate 23 and an upper plate 25. The base plate 23 carries a plurality of vertical supports 26, each of which includes a spacer 27 for spacing the plate 24 above the plate 23. The plate 24 is generally rectangular and is secured at three of its corners to the supports 26 by means of screws 24a (Fig. 2). The upper plate 25 is secured to the supports 26 by a plurality of nuts 28 (only one of which is shown in Fig. 1) on reduced threaded upper ends of the supports 26.

The plates 24 and 25 are spaced apart by a member preferably in the form of a casing 29 pinned respectively at its lower and upper ends to the plates 24 and 25 as at 30. The casing 29 is provided with an annular wall 31 which defines a cylindrical chamber 32. The casing further includes a semi-circular wall 33 adjacent the chamber 32 to provide a second chamber 34 separated from the chamber 32 by a continuation 35 of the annular wall 31 on which is mounted cutting means including a blade 36. The blade 36 is proximate to an opposite portion 37 of the wall 31 and the blade and wall portion 37 provide generally a wall commonly tangential to both chambers 32 and 34. This wall is perforated by an elongated opening or slit 38 forming a means of communication between the two chambers.

The upper plate 25 is provided with an opening 39 which receives a funnel or hopper 40 by means of which a deformable substance, such as meat or other food product, may be fed to the chamber 32. The plate 24 includes a central opening vertically axially alined with the motor shaft 22 into which is fitted a bearing 41 for journaling the intermediate portion of a vertical shaft 42, the lower portion of which is connected in driving relation to the motor shaft 22 by a coupling 43.

The upper portion of the shaft 42 projects axially upwardly into the chamber 32 and carries for rotation therewith a rotary member in the form of an impeller 44 having a pair of diametrically opposed vanes 45, the outermost vertical edges of which operate in relatively close clearance-space relation to the interior annular surface of the chamber 32. The intermediate portion of the impeller 44 between the vanes 45 is cut away or recessed at 46 to increase the capacity of the chamber 32 for containing the substance to be handled. The direction of rotation of the impeller 44 by the motor shaft 22 is indicated by the arrow in Fig. 2. The base plate 23 includes a central opening within which is carried a bearing 47 for journaling a lower portion of the shaft 42.

The upper and lower plates 25 and 24 journal for rotation on an axis parallel to the axis of the shaft 42, a rotary member in the form of a receiving or shaping cylinder 48, the upper plate 25 being provided with a bushing 49 for carrying a reduced end 50 of the cylinder and the lower plate including a bushing 51 for journaling a shaft extension 52 on the cylinder. The cylinder 48 is of such size and shape as to be rotatable within the chamber 34. In the form of the invention shown in Figs. 1, 2 and 3, the cylinder 48 includes an annular or peripheral surface provided with a plurality of recesses 53 spaced both axially and circumferentially of the cylinder. In other words, the recesses 53, which are herein shown as generally circular pockets or depressions, are spaced both longitudinally and transversely of the cylinder as respects the direction of movement thereof as indicated by the arrow in Fig. 2. These recesses or depressions move successively past the opening 38 between the chambers 32 and 34 as the cylinder 48 rotates.

The chamber 34 which contains the cylinder 48, opens into a discharge chute 54.

The shaft 42 has a driving gear 55 constrained for rotation with a section between the plates 23 and 24. This gear drives a pinion 56 with which the receiving or shaping cylinder 48 (Fig. 1) is constrained for rotation. As indicated by the arrows in Fig. 2, the vanes of the impeller 44 and the cylindrical surface of the cylinder 48 move generally in the same direction when they are proximate through the opening or slit 38. The diameter of the peripheral surface of the cylinder 48 is substantially equal to the diameter of the pitch circle of the pinion 56 and the inside diameter of the chamber wall 31 is substantially equal to the diameter of the pitch circle of the gear 55, wherefore the peripheral speed of the cylinder 48 is virtually equal to the speed of the surface of meat or other substance sliding along the cylindrical chamber wall under impetus received from the impeller 44.

In the operation of this form of the invention, meat or other firm though cuttable and deformable substance is fed through the hopper 40 to the chamber 32. This substance fills the chamber on both sides of the vanes 45 and the impeller is rotated by the motor shaft 22. In the particular machine herein illustrated it is found that a motor speed of approximately 1800 R. P. M. is suitable for rotating meat in the chamber 32. Centrifugal force imparted to the meat by rotation thereof forces or extrudes surface portions thereof through the opening or slit 38 to be received by the recesses 53 in the receiving cylinder 48. This phase of the operation of the machine occurs at a relatively high rate of speed, so that, in fact, surface portions of the meat are successively extruded by centrifugal force through the opening 38 and are successively received by succeeding series of recesses 53 as these recesses are presented to the opening by rotation of the cylinder 48. As surface portions of the meat are extruded through the opening 38 and received by the proximate recesses 53, such portions are shaped to conform to the recesses and are cut off by the cutter or blade 36. The arrangement of the blade 36 is such that the cutting or slicing action occurs along a line substantially coincident with an axially extending section of the cylindrical path described by the outermost portions on the cylindrical surface of the cylinder 48. Inasmuch as the surface of the cylinder 48 at the opening 38 travels in the same direction and at the same peripheral speed as the cylindrical surface of the quantity of meat being rotated in the chamber 32 and, further, since the cutter blade 36 is in opposition to this direction of movement, the surface portions extruded through the opening 38 and received and shaped by the recesses 53 in the cylinder 48 will not be torn off or otherwise mutilated but will be sliced off or severed cleanly into portions of substantially uniform size and shape.

As mentioned above, one disadvantage in prior machines is that the presence of fat or tallow frequently frustrates their operation. This is thought to occur because fatty portions of the meat are relatively fluidal under pressure and are not therefore subject to advance with sufficient positiveness by an auger screw, although filling space that could otherwise be occupied by meat of sufficiently solid texture to be advanced. No disadvantage of this character is experienced with embodiments of the present invention because substance of fatty texture is uniformly extruded along with the meat through the opening 38. Moreover, there is a continuous change in the surface from which the portions to be sliced away are projected, thereby requiring less extrusion force than is necessary to cause issuance of endless strings through a perforated plate.

The meat or other substance received and shaped by the recesses 53 in the cylinder 48 is discharged therefrom into the chute 54 by centrifugal force developed by rotation of the cylinder 48. This result represents an important feature of the invention, since it eliminates the necessity for providing additional mechanism for discharging the cut or reduced portions of the substance.

The machine may be operated without danger to the operator, because the impeller 44 does not present the same hazzard as a revolving screw in the event that the operator happens to extend his fingers into the chamber 32.

The machine may be simply and inexpensively constructed and involves relatively few moving parts, none of which is likely to require adjustment and maintenance.

Figs. 4 and 5

In this embodiment of the invention the impeller 44 is replaced by a modified form of impeller 60 having a circular bottom wall 61 and a pair of diametrically opposed vanes 62 joined at their upper ends by an integral circular ring 63 which has a relatively large central opening 64 alined with the opening in the hopper 40. Substantially the entire interior of the impeller 60 is open as at 65 to increase the capacity of the impeller and chamber 32 for containing the deformable substance. The general operation of the machine equipped with the impeller 60 is substantially the same as that described in connection with Figs. 1, 2 and 3.

Figs. 6 and 7

As previously stated, it is a feature of the present invention to provide cutting blocks or receiving and shaping cylinders having recessed surfaces of various configurations so that the surface portions of the food product or like substance may be cut or sliced into desired shapes. As representative of this feature of the invention, there is shown in Figs. 6 and 7 a modified form of cylinder 68 having its receiving and shaping surface provided with a plurality of recesses in the form of relatively shallow rectilinear pockets 69 by means of which the extruded surface portions of the substance will be cut into chips. The cylinder is provided with upper and lower shaft extensions 70 and 71 respectively for mounting in the bushings 49 and 51.

Figs. 8 and 9

These figures show a still further modified form of receiving and shaping cylinder 78 in which the recesses are in the form of rectilinear pockets 79 relatively deeper than the pockets 69 in the cylinder 68 whereby the surface portions extruded and cut from the substance will be substantially in the form of cubes. The cylinder 78 includes shaft extensions 80 and 81 for mounting in the bushings 49 and 51.

Fig. 10

This figure shows a cylinder 88 provided with a plurality of circumferentially spaced longitudinally running flutes or grooves 89. The use of the machine with this type of cylinder results in cutting of the extruded surface portions of the substance into relatively long strips of uniform length, as would be the desired result in the case of producing "shoe-string" potatoes. This cylinder includes shaft extensions 90 and 91 for mounting in the bushings 49 and 51.

Fig. 11

This form of cylinder, designated generally by the numeral 98, is provided with a plurality of grooves or annular recesses spaced axially on the cylinder. This cylinder will likewise cut the substance or product in strip from. The cylinder includes shaft extensions 100 and 101 for journaling the cylinder in the bushings 49 and 51.

In general

The cylinder constructions and surface configurations thereof can, of course, be varied to suit the type of result desired, the foregoing being merely representative of several forms that such cylinders can assume. Other variations may be made in the general construction and operation of the machine without departing from the fundamental principles of the invention. It is therefore not intended that the invention be limited to the precise details of construction and operation illustrated and described.

What is claimed is:

1. A machine of the class described, comprising: a casing having an annular wall providing a chamber for receiving a deformable substance and including an opening through the wall of the casing and through which surface portions of the substance may be extruded; means including a rotary element in the chamber for rotating the substance within the chamber at such speed that the substance is urged by centrifugal force against the casing wall to extrude surface portions thereof through the opening; a shaping element movable past the opening outside the chamber in contiguous closing relation with the opening and including a shaping portion having a recess of a desired shape arranged to face the opening, as said element moves past the opening, for receiving and shaping an extruded surface portion of the substance; a cutting element arranged adjacent the opening and opposed to the direction of movement of the shaping element for cutting a shaped extruded portion from the substance substantially along a plane passed between the shaping element part and that portion of the casing wall that includes the opening; and means for moving the shaping element at such speed and in such direction as to discharge a shaped and cut extruded portion from the shaping recess by centrifugal force.

2. The invention set forth in claim 1, further characterized in that: the opening is elongated axially of said annular wall; and the cutting element borders an elongated edge of the opening.

3. The invention set forth in claim 1, further characterized in that: driving means is provided for driving the shaping element and rotary element, said means being constructed and arranged to move said elements so that the recessed portion of the shaping element and the surface portion of the substance that are proximate through the opening move generally in the same direction and at substantially the same peripheral speed.

4. The invention set forth in claim 1, further characterized in that: the shaping portion includes a plurality of recesses of desired shapes arranged generally in both longitudinally and transversely spaced relation in the shaping portion as respects the direction of movement thereof so as to successively receive extruded portions of the substance through the opening as the shaping portion moves past the opening.

5. The invention set forth in claim 1, in which: the shaping portion includes a cylindrical periphery containing a plurality of recesses extending circumferentially thereof for presentation to the opening as the shaping portion moves past such opening.

6. The invention set forth in claim 1, in which: the shaping portion includes a cylindrical periphery containing a plurality of elongated pockets extending lengthwise thereof for presentation to the opening as such shaping portion moves past the opening.

7. The invention set forth in claim 1, in which: the shaping portion includes a cylindrical periphery containing plurality of grooves for presentation to the opening as the shaping portion moves past such opening.

8. A machine of the class described, comprising: first and second generally cylindrical casings arranged side by side on generally parallel axes and having a common tangential wall provided with an opening therethrough; a rotary member in the first casing for rotating a deformable substance in said first casing to extrude surface portions of said substance through the opening to the second casing; a cylindrical rotary member in the second casing including recesses in its cylindrical periphery which is disposed in close proximity to the opening for closing the same while accommodating direct extrusion of portions of the substance into such recesses while they are in registry with such opening; means for rotating both members so that the surface portions of the substance and the recessed periphery of the second member travel past the opening at substantially the same peripheral speed and in the same direction; and cutting means positioned at the opening in opposition to said direction of movement for cutting the extruded portions from the substance.

9. A machine of the class described, comprising: a pair of adjacent chambers separated by a common wall having an opening therethrough connecting the chambers; a cutter along one edge of the opening; means in one chamber for moving a deformable substance against said wall in a direction toward the other chamber for extruding a portion of the substance through the opening and into the other chamber; receiving means rotatable in said other chamber for receiving the extruded portion and moving it against the cutter to sever said portion from the substance; and means for rotating the receiving means at such speed as to discharge the severed portion therefrom by centrifugal force.

10. A machine of the class described, comprising: an annular wall providing a chamber for receiving a deformable substance; means providing an opening through the wall through which a surface portion of the substance may be extruded; means cooperable with the chamber and engageable with the substance therein for moving the substance radially of the chamber toward the opening for extruding a surface portion thereof through the opening; shaping means outside the chamber in proximity to the opening and including a recessed portion for receiving and limiting the volume of the extruded surface portion; a cutting element adjacent the opening; means for moving the recessed portion of the shaping means and the cutting element relatively to sever the shaped and extruded portion from the substance; and means for discharging the shaped and severed portion from the shaping means.

11. A machine of the class described, comprising: a casing having an annular wall providing a chamber for receiving a deformable substance; means providing an elongated opening through the annular wall running generally lengthwise of the chamber; a rotary member in the chamber including a radial vane having an edge running generally lengthwise of the chamber in relatively close clearance-space relation to the chamber wall for rotating the substance within the chamber; means for rotating the vane at such speed as to extrude surface portions of the substance centrifugally through the opening; shaping means operable outside the casing and in proximity to the opening adapted for receiving spaced-apart surface portions of the substance in registry with the opening to thereby facilitate extrusion of such portions while blocking extrusion of surface portions intervening with the spaced-apart portions; means for moving said shaping means in substantial parallelism with the plane of such opening and at a speed substantially equal to that at which said surface portions are caused to move circumferentially of said chamber and in the same direction; and means cooperable with said shaping means for cutting off said extruded spaced-apart surface portions pursuant to such movement of the shaping means.

12. A machine of the class described, comprising: a casing having an annular wall providing a chamber for receiving a deformable substance; means providing an elongated opening through the annular wall running generally lengthwise of the chamber; a rotary member in the chamber including a radial vane having an edge running generally lengthwise of the chamber in relatively close clearance-space relation to the chamber wall for rotating the substance within the chamber; means for rotating the vane at such speed as to extrude surface portions of the substance centrifugally through the opening; means bordering the opening including a knife arranged in opposition to the direction of rotation of the substance so as to be engaged by the extruded portion; and means engageable with the extruded portion outside the chamber to limit the extrusion distance thereof, and movable in the same direction as the immediate surface of the substance from which said portion has been extruded, for moving the extruded portion against the knife.

13. A machine of the class described, comprising: means including a wall provided with a discharge opening therethrough; means at one side of the wall for containing a deformable substance; impelling means operable at said side of the wall for moving the substance by centrifugal force against that portion of the wall including the opening to deform the substance and extrude a surface portion thereof through the opening; rotatable receiving means at the other side of the wall in which said extruded portion is deposited and adapted to receiving spaced-apart extruded portions of the substance while blocking extrusion of intervening portions thereof; means operable between the receiving means and said other side of the wall for slicing the spaced-apart extruded portions from the substance during rotation of the rotatable means; and means for discharging the deposited and sliced extruded portion from the receiving means.

14. A machine of the class described, comprising: a pair of adjacent chambers separated by a common wall having an opening therethrough connecting the chambers; a cutter along one edge of the opening; means in one chamber for moving a deformable substance against said wall in a direction toward the other chamber for extruding a portion of the substance through the opening and into the other chamber; receiving means movable in said other chamber for receiving the extruded portion and moving it against the cutter to sever said portion from the substance; and means for moving the receiving means at such speed and in such direction as to discharge the severed portion therefrom.

JOE R. URSCHEL.

REFERENCES CITED

The following references are of record in the file of this patent:

UNITED STATES PATENTS

| Number | Name | Date |
| --- | --- | --- |
| 708,778 | Nieters | Sept. 9, 1902 |
| 1,524,915 | Debay | Feb. 3, 1925 |
| 1,873,351 | Smith | Aug. 23, 1932 |
| 2,163,878 | Hornung | June 27, 1939 |
| 2,242,557 | Urschel | May 20, 1941 |
| 2,278,772 | Duden | Apr. 7, 1942 |